(12) United States Patent
Oza et al.

(10) Patent No.: US 11,731,841 B2
(45) Date of Patent: Aug. 22, 2023

(54) AUTOMATED GEMSTONE FEEDING

(71) Applicant: Sahajanand Technologies Private Limited, Gujarat (IN)

(72) Inventors: Chirag Oza, Nagalpur Gujarat Mehsana (IN); Munjal Gajjar, Adajan Patia Gujarat Surat (IN); Rahul Gaywala, Gujarat Surat (IN)

(73) Assignee: Sahajanand Technologies Private Limited, Gujarat Surat (IN)

( * ) Notice: Subject to any disclaimer, the term of this patent is extended or adjusted under 35 U.S.C. 154(b) by 0 days.

(21) Appl. No.: 17/290,859

(22) PCT Filed: Nov. 5, 2019

(86) PCT No.: PCT/IN2019/050817
§ 371 (c)(1),
(2) Date: May 3, 2021

(87) PCT Pub. No.: WO2020/095318
PCT Pub. Date: May 14, 2020

(65) Prior Publication Data
US 2021/0387811 A1 Dec. 16, 2021

(30) Foreign Application Priority Data
Nov. 5, 2018 (IN) .............. 201821041903

(51) Int. Cl.
*B65G 47/14* (2006.01)
*B28D 5/00* (2006.01)
(Continued)

(52) U.S. Cl.
CPC ....... *B65G 47/1492* (2013.01); *B28D 5/0082* (2013.01); *B65G 47/19* (2013.01); *B65G 47/683* (2013.01); *B65G 47/763* (2013.01)

(58) Field of Classification Search
CPC . B65G 47/763; B65G 47/683; B65G 47/5131
See application file for complete search history.

(56) References Cited

U.S. PATENT DOCUMENTS

| 1,516,016 A | | 11/1924 | Kallenbach |
| 4,359,149 A | * | 11/1982 | Erlichman ............. B65G 37/02 198/606 |
| 5,579,951 A | * | 12/1996 | Revelle ............... B65G 47/1492 221/95 |

FOREIGN PATENT DOCUMENTS

| CN | 104986386 A | 10/2015 |
| WO | WO-2020095318 A1 | 5/2020 |

OTHER PUBLICATIONS

"International Application No. PCT/IN2019/050817, International Search Report and Written Opinion dated Feb. 14, 2020", (dated Feb. 14, 2020), 9 pgs.

* cited by examiner

*Primary Examiner* — William R Harp
(74) *Attorney, Agent, or Firm* — Schwegman Lundberg & Woessner, P.A.

(57) ABSTRACT

Examples of automated gemstone feeding are described. According to an example, a gemstone feeding machine includes a conveyor belt assembly to feed holders carrying gemstones. The conveyor belt assembly can include a plurality of conveyor belts in two sets positioned parallel to each other and the two sets can move in opposite directions. Each belt in one set can be positioned alternately with respect to each belt in the other set. The assembly can include a fixed guiding plate at a first end of the conveyor belts and a detachable guiding plate adjacent to the loading assembly at a second end of the conveyor belts. The fixed guiding plate and the detachable guiding plate each com- (Continued)

prises a plurality of transition profiles in alignment with immediately adjacent conveyor belts.

16 Claims, 5 Drawing Sheets

(51) Int. Cl.
*B65G 47/19* (2006.01)
*B65G 47/68* (2006.01)
*B65G 47/76* (2006.01)

AUTOMATED GEMSTONE FEEDING

PRIORITY CLAIM TO RELATED APPLICATIONS

This application is a U.S. national stage filing under 35 U.S.C. § 371 from International Application No. PCT/IN2019/050817, filed on 5 Nov. 2019, and published as WO2020/095318 on 14 May 2020, which claims the benefit under 35 U.S.C. 119 to India Application No. 201821041903, filed on 5 Nov. 2018 the benefit of priority of each of which is claimed herein.

TECHNICAL FIELD

The present subject matter relates, in general, to gemstone feeding and, particularly but not exclusively, to automated gemstone feeding.

BACKGROUND

Rough gemstones have irregular dimensions, and undergo diverse processing steps, such as planning, estimating, measuring physical attributes, sawing, bruiting, and polishing to reach to finished state. In certain cases, the processing steps may be performed on multiple machines, such as gemstone planner machine, gemstone cutting machine, and the like, collectively referred to as a gemstone processing system. The step of planning of gemstone is performed in a gemstone planner machine. The gemstone planner machine scans the rough gemstone to measure basic geometry thereof. For example, shape, dimensions (length, width, and height). Thereafter, the gemstone planner machine estimates physical attributes of the gemstone based upon the geometry of the gemstone. The physical attributes along with the rough gemstone may be transferred further to the gemstone cutting machine for further cutting process. In certain other cases, the processing steps may be performed on an integrated machine wherein different parts of the integrated machine perform the various processing steps. Accordingly, the step of planning of gemstone followed by one or more subsequent processing step may be performed within the integrated machine without having to transfer the gemstone from one machine to another.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
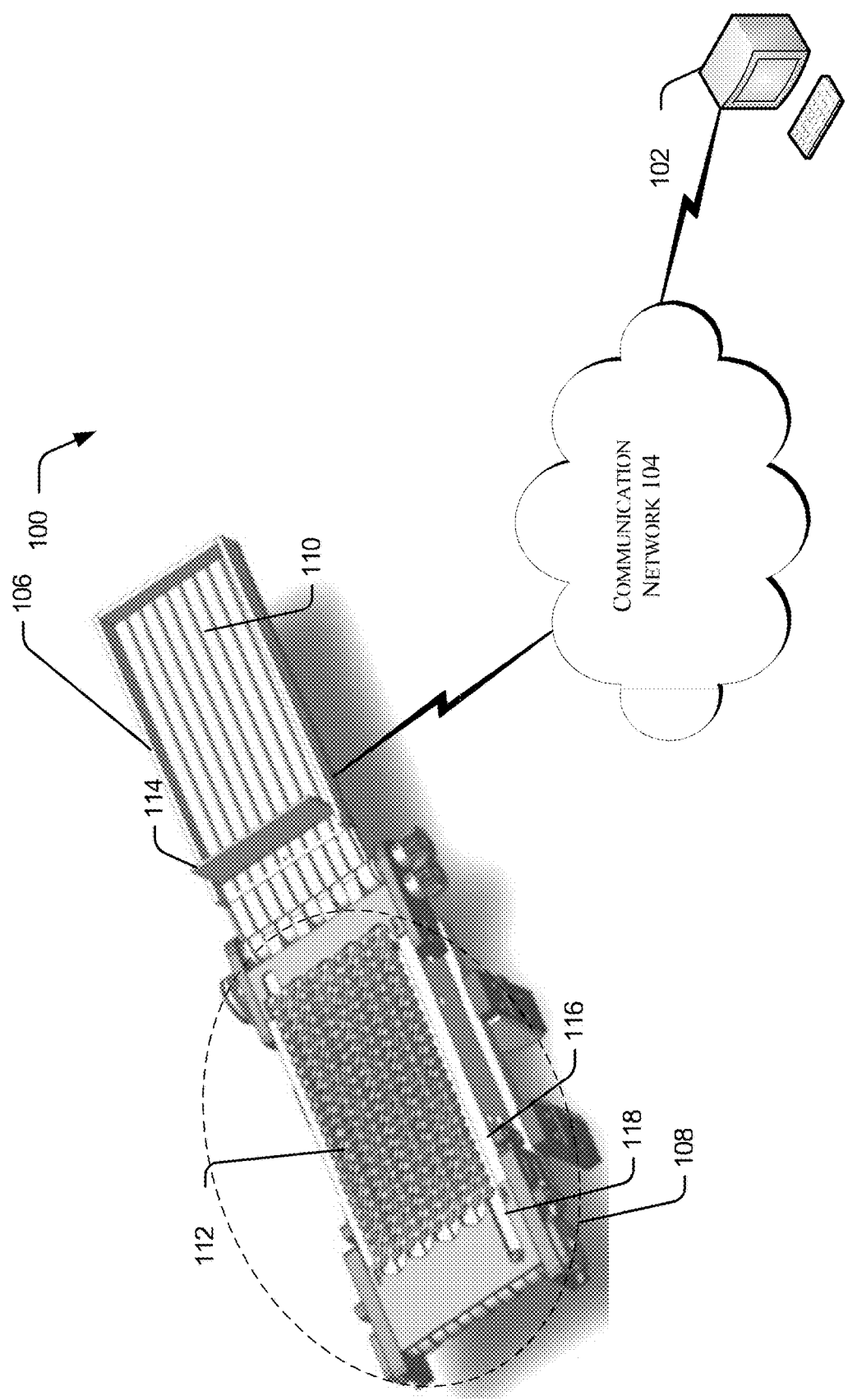
FIG. 1 schematically illustrates a gemstone feeding machine, in accordance with an embodiment of the present subject matter FIGS. 2 (a)-2 (d) illustrate automated feeding of the gemstone by the gemstone feeding machine, in accordance with another embodiment of the present subject matter
Figure 2A:
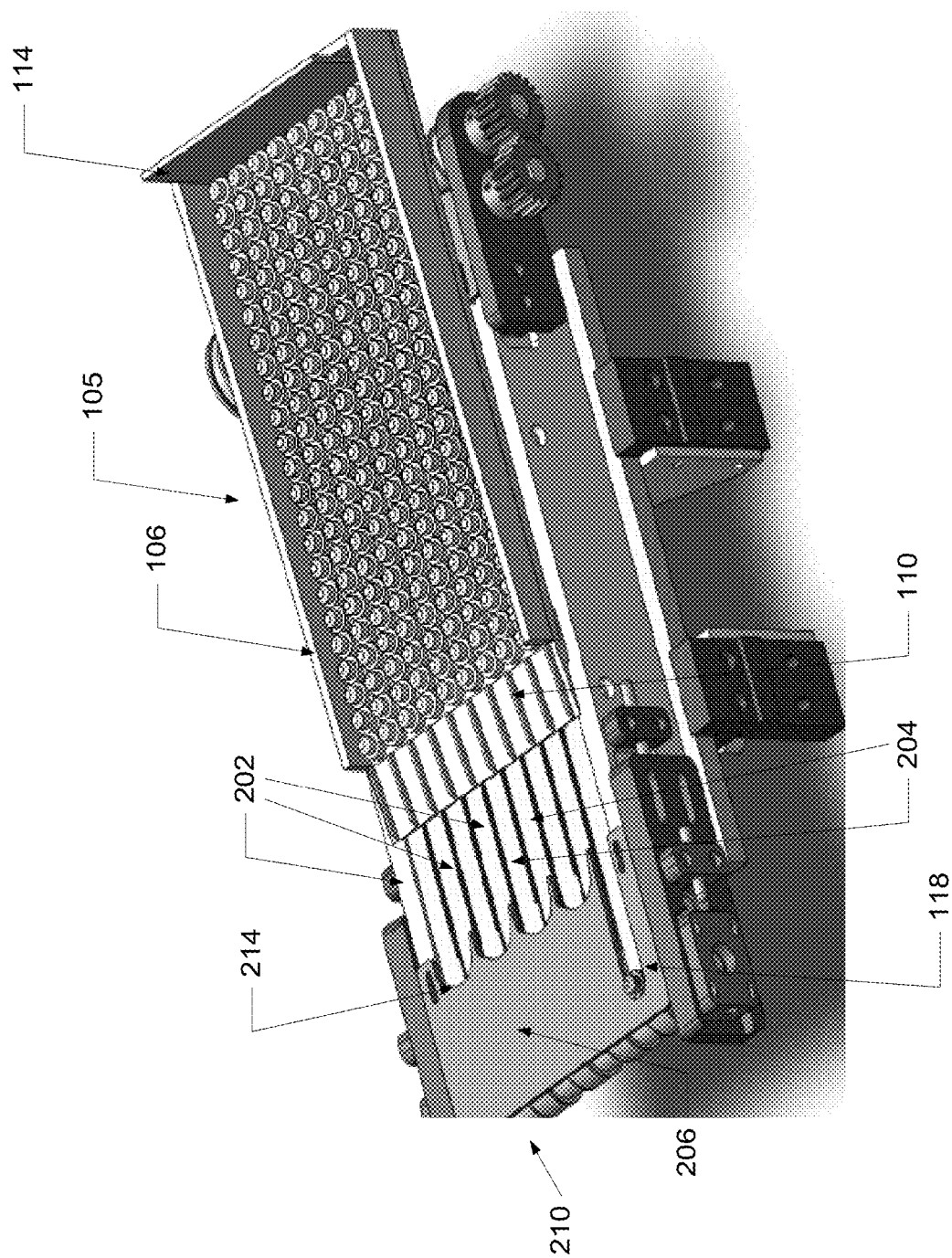
Figure 2B:
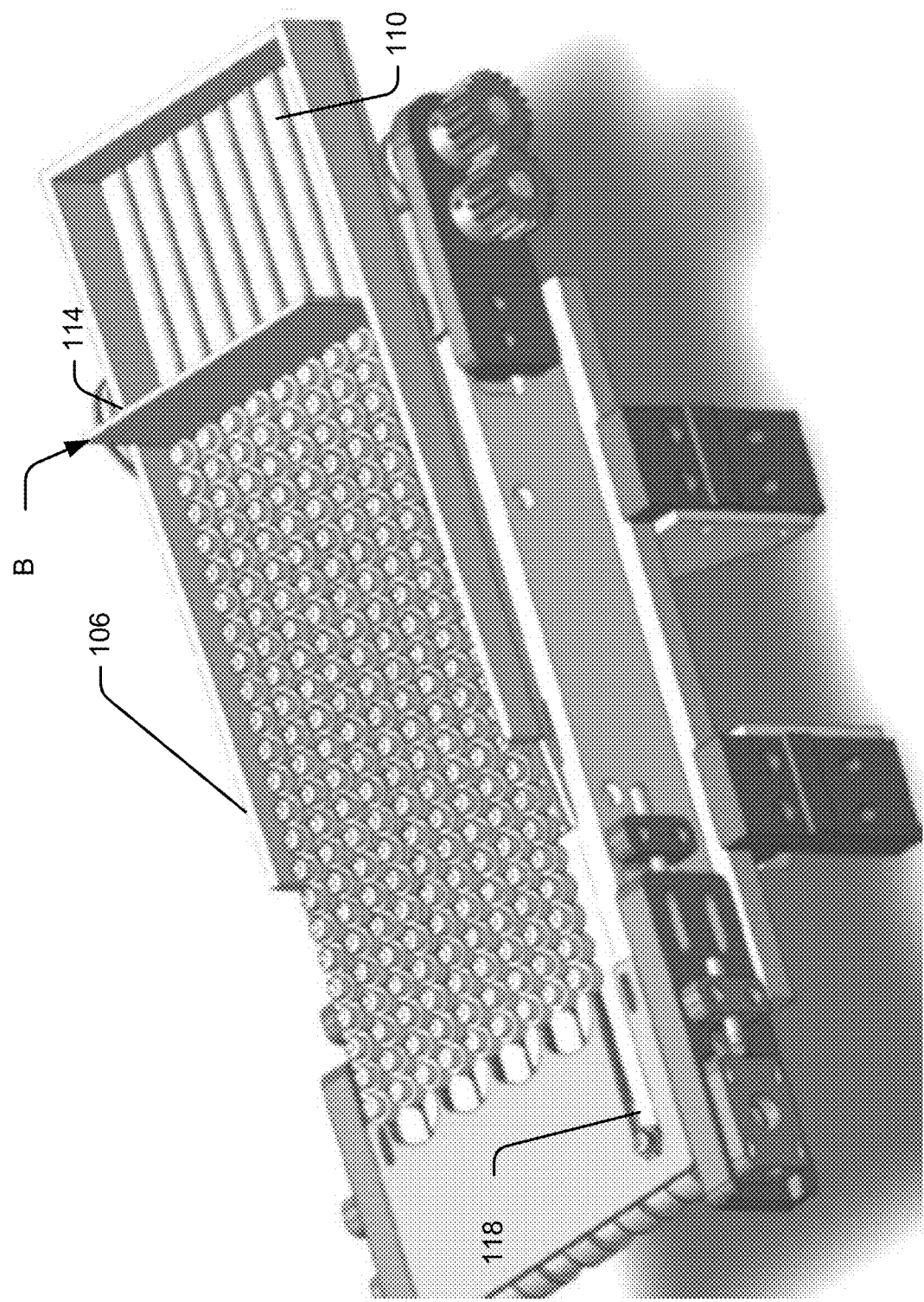
Figure 2C:
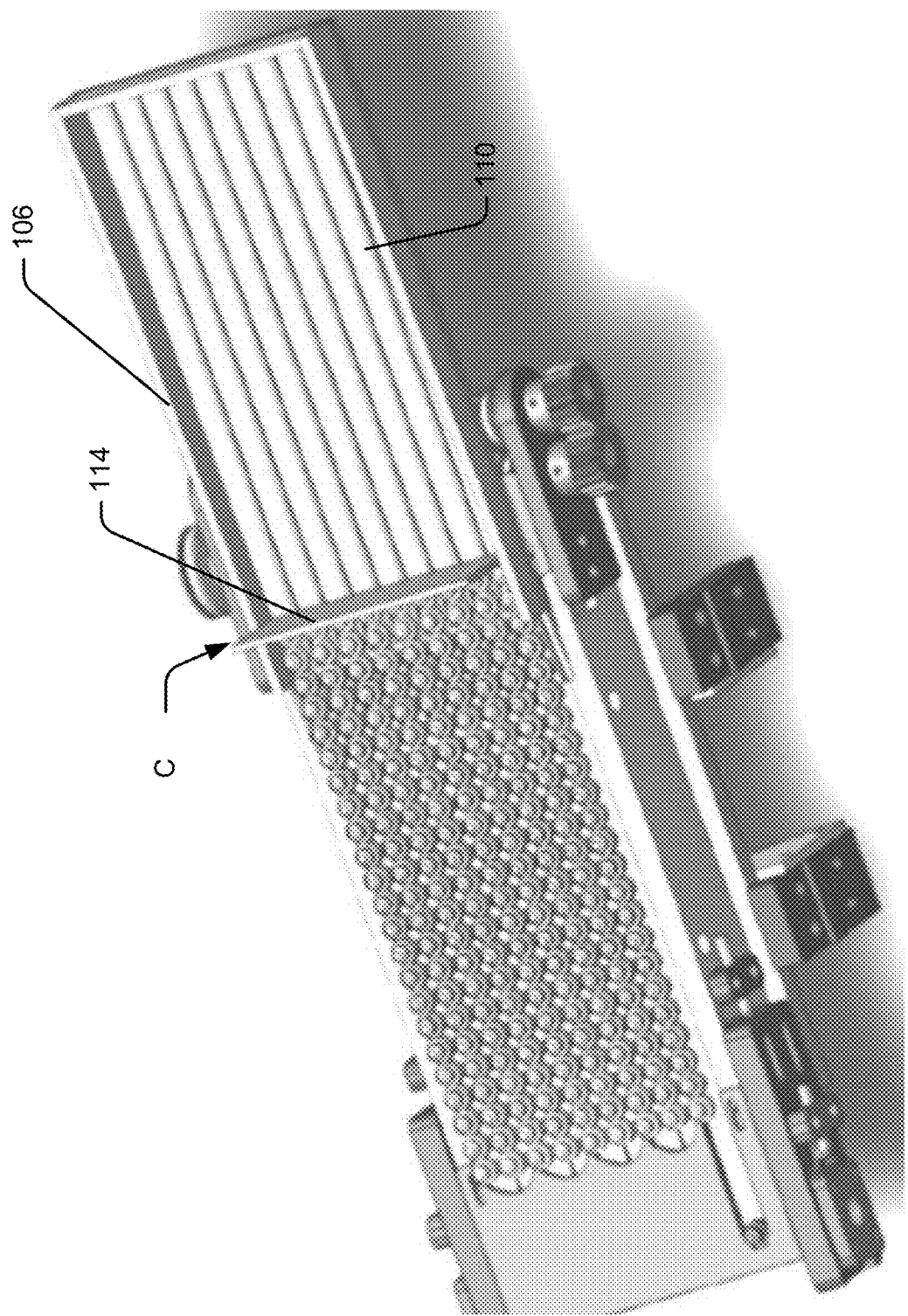
Figure 2D:
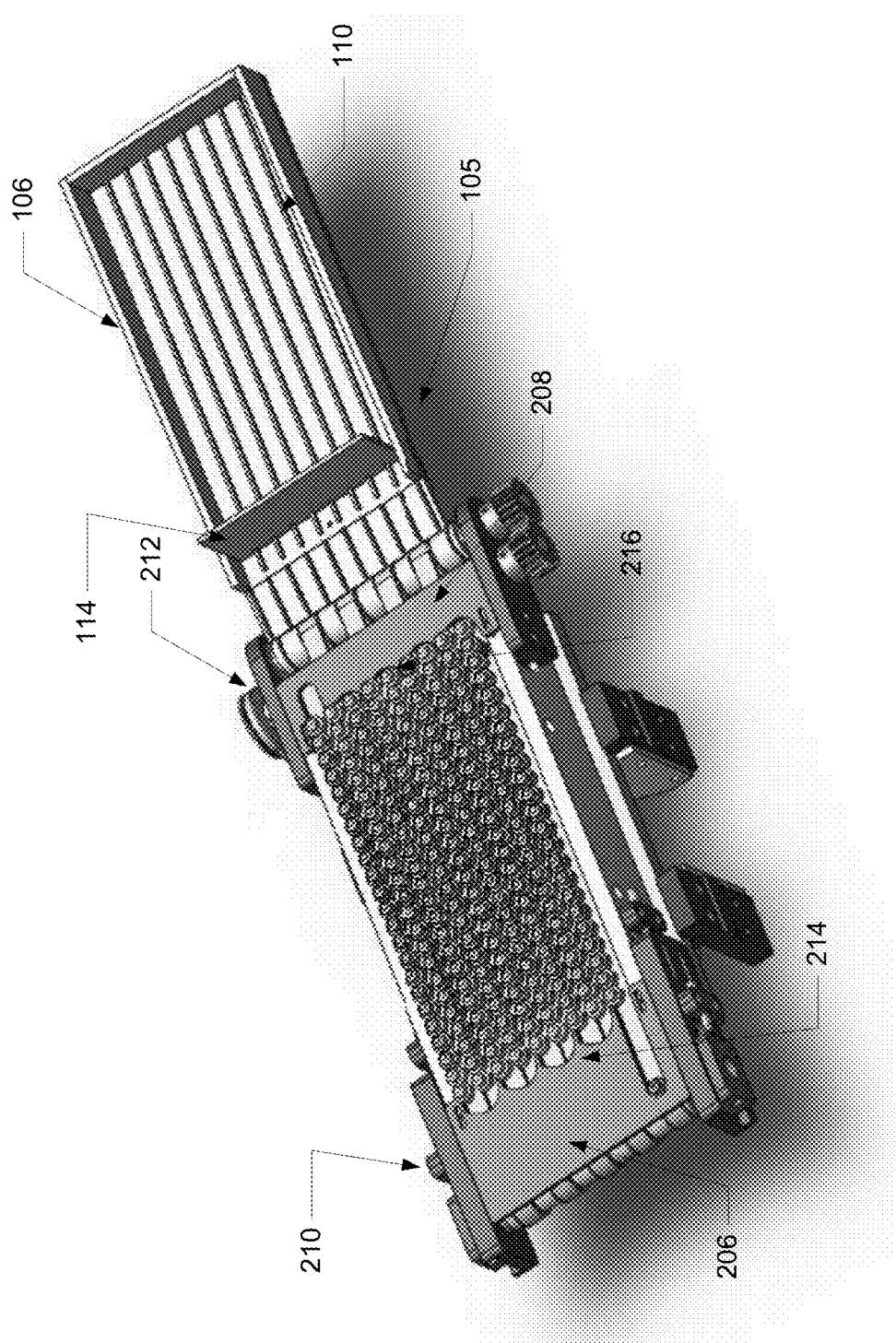

The present subject matter relates to aspects relating to automatic feeding of gemstones in a gemstone planner machine.

Usually, for the processing steps each to be performed on a particular machine, the gemstone has to be fed to that machine using a conveyor assembly. The conveyor assembly may be designed based on type and quantum of the gemstones to be conveyed. Generally, during operation of the conveyor assembly, the gemstones are loaded either manually or with the help of a loading machine. Thereafter, the conveyor belt may transmit the gemstones from the loading area to the discharge area where the gemstones are unloaded either manually, or with the help of an unloading machine. In some cases, the gemstones get unloaded from the conveyor belt by simply falling off the end of the conveyor belt.

There may be cases where the gemstones are needed to be sequentially discharged. However, conventional conveyor assemblies may not be able to do so. One of the ways to do so is to place the gemstone manually in a sequential manner so that they are discharged sequentially. However, such a task is labor intensive and time-consuming. Moreover, manually placing the gemstone also limits the throughput of the conveyor assembly. In addition, to increase the number of gemstones that can be sequentially fed on the conveyor, the length of the conveyor belt has to be increased. The more the gemstones to be fed, greater the length of the conveyor belt. Sometimes, however, this may not be possible given the space constraints around the gemstone processing system. Therefore, the conventional conveyor assemblies are ineffective in adequately feeding the gemstones in a sequential manner to the required machine in the gemstone processing system.

To this end, a gemstone feeding machine for automatically feeding gemstones affixed to a holder to another machine or to multiple machines is described. The machines that the gemstones are fed to may perform the various processing steps relating to gemstone processing. The gemstone feeding machine for automatic feeding of gemstones overcomes the above-described problems associated with manual feeding technique and ensure that gemstones are continuously fed to the machines with any interruptions.

The gemstone feeding machine may convey gemstones, for example, to a gemstone planner machine. The described embodiments are provided as non-limiting examples of the apparatus and method for automatic feeding of gemstones using the gemstone feeding machine. It would be understood by one skilled in the art that implementations of the apparatus and method for automatic feeding of gemstones in the gemstone planner machine may be extended to other machines, such as gemstone cutting machines as well.

In an embodiment, the rough gemstones are affixed to their respective holders and a feeding assembly of the gemstone planner machine may receive the rough gemstones affixed to their respective holders. In an example, an operator feeds plurality of rough gemstones affixed to their respective holders to the gemstone feeding machine. The feeding by the operator is a one time process and human intervention in process of gemstone planning ends after the feeding. After receiving the plurality of the rough gemstones affixed to holders, the feeding assembly allows uninterrupted supply of gemstones from the gemstone feeding machine. Thus, intervention by the operator is eliminated during the gemstone processing and human dependency is reduced.

The gemstone feeding machine can include a conveyor belt assembly and a loading assembly for loading the gemstones to the gemstone feeding machine. The loading assembly can include a loading tray with a slider. The conveyor belt assembly includes a plurality of conveyor belts parallel to each other and includes a sensor. The components of the loading assembly and the conveyor belt assembly can be operably coupled to a processing unit for being controlled for coordinated operation to carry out the various functions and operations of the gemstone feeding machine. In an embodiment of the present subject matter, the loading tray may include plurality of parallel channels to accommodate the gemstones affixed to the holders. Further, the configuration of the channels of the loading tray are such that, the channels can be aligned along the conveyor belts of the conveyor belt assembly, such that one channel in the loading tray is aligned with one conveyor belt. In addition, the loading tray may be capable of being tilted in the direction of the conveyor belt assembly to facilitate the loading of gemstones onto the conveyor belt assembly.

In an implementation, the operator loads the plurality of holders having gemstones affixed thereto onto the channels of the loading tray, when loading tray is aligned with the conveyor belt assembly such that the channels of the loading tray are aligned with the respective conveyor belt. Next, the slider of the loading tray can push the holders from the channels onto the conveyor belts. Upon receiving the holders, the conveyor belts can be actuated to feed one holder at a time, i.e., sequentially. For instance, the conveyor belt assembly can have a discharge region at which each holder is positioned for being fed further. For example, the sensor can be positioned at the discharge region for triggering the holder to be fed further for processing from the gemstone feeding machine. For example, the sensor can send a signal to the processing unit of the gemstone feeding machine or of a subsequent processing machine to which the gemstone is to be fed further.

In addition, in order to reduce the size of the gemstone feeding mechanism, as mentioned above, the conveyor belt assembly can include the plurality of parallel conveyor belts. Further, for adequate operation of the conveyor belt assembly, each alternate conveyor belt in the conveyor belt assembly can move in opposite directions such that the alternate conveyor belt can carry the holder in opposite directions. At both the ends of the conveyor belts, a guiding plate may be provided which guides the holder from one conveyor belt to the next. For instance, in operation, when the holder on one conveyor belt moving in a first direction arrives at the end of that conveyor belt, a transition profile of the guiding plate guides the holder onto the subsequent conveyor belt moving in the second direction opposite to the first direction. When the holder arrives at the end of the conveyor belt, another guiding plate guides the holder to a subsequent conveyor belt moving in the first direction. Accordingly, multiple such parallel, alternately moving conveyor belts can be used along with the guiding plates having the corresponding transition profiles. The motions of the conveyor belts, combined with the design of the guiding plate, allows the holder to smoothly transition from one conveyor belt to another and be carried to the discharge region of the conveyor belt assembly.

The gemstone feeding machine is controlled by a processing unit, uses low-cost hardware equipment, and has limited or no manual intervention. Therefore, the gemstone feeding achieved in accordance with the techniques of the present subject matter provides accurate feeding of the holder having the gemstone attached thereto onto a subsequent machine in the gemstone processing system, thereby substantially reducing cost in generating the finished gemstone as well as enhancing the quality of the gemstone processing. In other words, the gemstone feeding machine achieves increase in accuracy of feeding of the rough gemstone and reduction cost associated with the equipment used for the feeding of the gemstone.

In addition, the present subject matter envisages a method of automatically feeding gemstones using the gemstone feeding machine, in accordance with the aspects of the present subject matter.

These and other advantages of the present subject matter would be described in greater detail in conjunction with the following figures. While aspects of gemstone feeding can be implemented in any number of different configurations, the embodiments are described in the context of the following device(s) and method(s).

FIG. 1 illustrate schematics of a gemstone feeding assembly 100 for feeding rough gemstones communicatively coupled to a computing device 102 over communication network 104, in accordance with an embodiment of the present subject matter.

In accordance with an embodiment of the present subject matter, the gemstone feeding machine 100 includes a loading assembly 105 having a loading tray 106 and includes a conveyor belt assembly 108. In an embodiment, configuration of the loading tray 106 and the conveyor belt assembly 108 are symmetrical to each other. The symmetrical configurations enable non-obstructed movement of gemstones affixed to holders 112 from the loading tray 106 to the conveyor belt assembly 108.

In an example, the loading tray 106 may include a plurality of channels 110 to receive rough gemstones affixed to holders 112 and a slider 114. In another example, the plurality of channels 110 may be configured to accommodate the holders 112. Further, an operator may manually feed gemstones affixed to holders 112 in the plurality of channels 110. In yet another example, the slider 114 may be movable, and the movement of the slider 114 may be controlled by the computing device 102. Further, the slider 114 may extend along width of the loading tray 106. Furthermore, the slider 114 may be moveable along length of the loading tray 106.

Further, the conveyor belt assembly 108 may include plurality of conveyor belts 116, a discharge region 118, a sensor, and a stopper. In an example, the plurality of conveyor belts 116 may be operated by a single motor, say a servo motor, a stepper motor or an assembly including a motor and a gear box for actuating the conveyor belts 116. In one example, the conveyor belts 116 may be positioned parallel to each other in forward-reverse belt pairs. Further, the conveyor belts 116 may be aligned to the channels 110 of the loading tray 106 to receive the gemstones from the loading tray 106. In other words, the conveyor belt assembly 108 can include a plurality of conveyor belts 116 positioned parallel to each other for forming a continuous path for feeding holders 112 carrying gemstones. The plurality of conveyor belts 116 can include a first set 202 of conveyor belts to move in a first direction and a second set 204 of conveyor belts to move in a second direction, i.e., one set can move in the forward direction and the other set can move in the reverse direction. The first set 202 of conveyor belts are positioned alternately with respect to the second set 204 of conveyor belts 204 and each conveyor belt in the first set 202 is adjacent to a conveyor belt in the second set 204. Accordingly, as shown in the Figures, each conveyor belt in the first set 202 is flanked on either side by conveyor belts from the second set 204 and vice versa, except for the beginning and last conveyor belts in the assembly 108. The alternate positioning of the belts coupled with the opposite motions provides a zig-zag continuous path of motion on the conveyor belts 116. This reduces the space occupied by the conveyor belts 116, while increasing the holder-carrying capacity of the conveyor belts 116 for that given space. The operation of the conveyor belt assembly 108 is explained in detail later.

In an example, the discharge region 118 may be understood as an end of the continuous path formed by the conveyor belts 116 of the assembly 108, such that the gemstones affixed to holders 112 may be picked from the discharge region 118 for transfer to next step of gemstone processing. In an embodiment, the next step may be gemstone planning, gemstone cutting, and the like. Further, the discharge region 118 may be configured to hold only one gemstone affixed to a holder 112 at a time.

After, the discharge region 118 receives a gemstone affixed to a holder 112, the sensor (not shown) may sense presence of the gemstone affixed to a holder 112 and may share sensed information with the computing device 102. In an example, the sensor may be placed in proximity of the discharge region 118. In another example, the sensor may be coupled to the discharge region 118. The computing device 102 may further be communicatively coupled to the stopper. The stopper may be placed between the conveyor belts 116 and the discharge region 118, such that, the stopper may allow movement of the holders 112 from the conveyor belts 116 to the discharge region 118. In an example, the stopper may be communicatively coupled to the sensor via the computing device 102, and may be configured to allow placement of only one gemstone affixed to a holder 112 on the discharge region 118 at a time, and to prohibit other gemstones affixed to their holders 112 to move to the discharge region 118.

In an implementation, the operator feeds the plurality of gemstones affixed to their respective holders 112 in the channels 110, such that, the plurality of gemstones with the holders 112 are arranged in plurality of queues in the loading tray 106. Next, the loading tray 106 is aligned along the conveyer belt assembly. After the alignment, a relative motion can be provided between the slider 114 and the loading tray 106 to push the plurality of the gemstones with the holders 112 towards the conveyor belt assembly 108 and onto the conveyor belts 116. In an example, the slider 114 can be coupled to an actuator of the loading assembly 105 to exhibit motion with respect to the loading tray 106 as well as the conveyor belt assembly 108. In another example, the loading tray 106 can be coupled to the actuator to move with respect to the slider 114 as well as the conveyor belt assembly 108. In either case, the relative motion is provided to push the holders 112 towards and onto the conveyor belts 116.

The actuator of the loading assembly 105 can be actuated by the computing device 102, for example, by a processing unit of the computing device 102. As a result of push by the slider 114, the plurality of gemstones with the holders 112 are transferred as queue to the conveyor belts 116. The conveyor belts 116 upon receiving the plurality of gemstones and holders 112 actuate in forward and reverse direction to move a gemstone with a holder 112 through the stopper, to the discharge region 118. Upon placement of the gemstone with the holder 112 on the discharge region 118, the sensor informs the computing device 102 about placement of the gemstone with the holder 112. The computing device 102 in turn commands the stopper to inhibit further movement of gemstone with holders 112 to the discharge region 118. In an example, the gemstone with the holder 112 on the discharge region 118 may be picked up for further steps of gemstone processing such as planning, cutting. Thus, the gemstone with the holder 112 is fed for gemstone analysis, planning, and processing, without human intervention by way of gemstone feeding machine 100 controlled by the computing device 102.

FIGS. 2 (*a*)-2 (*d*) illustrate the operation of the gemstone feeding machine 100 for feeding of gemstones affixed to holders 112, in accordance with an embodiment of the present subject matter.

As illustrated in FIG. 2 (*a*), the loading tray 106 having the plurality of channels 110 is aligned with the conveyor belt assembly 108, such that, the channels 110 of the loading tray 106 are aligned along the conveyer belts 116. Further, plurality of gemstones affixed to the holders 112 are fed in the channels 110. In an example, the plurality of the gemstones affixed to the holders 112 are arranged in symmetrical queue in the loading tray 106. In an implementation, the slider 114 is at rear end of the loading tray 106 at position A, when the gemstones with the holders 112 are fed in the loading tray 106. Thereafter, a relative motion is provided between the loading tray 106 and the slider 114 to push the holders 112 onto the conveyor belt assembly 108.

In one example, in which the slider 114 is movable, upon filling of the loading tray 106, the computing device 102 actuates the slider 114 from position A to position B, as illustrated in FIG. 2(*b*). As a result of actuation of the slider 114, the gemstones with the holders 112 in the loading tray 106 are pushed from the loading tray 106 to the conveyor belt assembly 108. The conveyor belts 116 begin receiving the gemstones with the holders 112 at the conveyor belt assembly 108. Further, upon actuation of the slider 114 from position B to C, all the gemstones with the holders 112 are completely transferred to the conveyor belts 116, as illustrated in FIG. 2(*c*). After, completion of the transfer of the gemstone with holders 112, the conveyor belts 116 initiate forward and reverse actuations under command of the computing device 102. As a result of the actuation, the gemstone with holders 112 are placed at the discharge region 118 one by one.

In an implementation, the loading tray 106 may initiate non-alignment movement under control of the computing device 102 after complete transfer of the gemstone with holders 112 to the conveyor belt assembly 108, as illustrated in FIG. 2 (*d*).

The operation of the conveyor belt assembly 108 is described hereinafter. The conveyor belt assembly 108, as mentioned previously, is positioned adjacent to the loading assembly 105. Also, as explained above, the conveyor belt assembly 108 includes the conveyor belts 116 which are positioned parallel to each other. In an example, in which the conveyor belt assembly 108 uses only two conveyor belts, the first conveyor belt 202 can move in a first direction and the second conveyor belt 204 can move in a second direction opposite to the first direction. Further, the first conveyor belt 202 and the second conveyor belt 204 can be each aligned with a channel 110 from amongst the plurality of channels 110 of the loading tray 106 of the loading assembly 105.

In another example, as shown in FIG. 2(*a*)-2(*d*), the conveyor belt assembly 108 can include two sets 202, 204 of oppositely moving conveyor belts, and each belt of one set is alternately positioned with respect to each belt of the other set. Accordingly, the plurality of conveyor belts 116 can include a first set 202 of conveyor belts to move in a first direction and a second set 204 of conveyor belts to move in a second direction, i.e., one set 202, 204 can move in the forward direction and the other set 202, 204 can move in the reverse direction. Further, as shown in the figures, each conveyor belt in the first set 202 is flanked on either side by conveyor belts from the second set 204 and vice versa, except for the beginning and last conveyor belts in the assembly 108. The alternate positioning of the belts coupled with the opposite motions provides a zig-zag continuous path of motion on the conveyor belts 116. In addition, the operation of the conveyor belts 116 is facilitated by guiding plates which provide for guiding the holders 112 along the path, and in fact, forming the turns in the zig-zag paths. In an embodiment, the conveyor belt assembly 108 can include a fixed guiding plate 206 and a detachable guiding plate 208. The fixed guiding plate 206 can be positioned at a first end 210 of the plurality of conveyor belts 116 whereas the detachable guiding plate 208 can be positioned at a second end 212 of the plurality of conveyor belts 116. As will be understood, the first and the second ends of the conveyor belts 116 can be the two opposite ends of the conveyor belts 116 when they are all positioned parallel to each other, as shown in the figures. The detachable guiding plate 208 can be positioned adjacent to the loading assembly 105. During operation, the detachable guiding plate 208 can be detached, for example, at the time of loading of the conveyor belts 116 using the loading assembly 105 in the manner explained above. Once the conveyor belts are loaded with the holders 112, the detachable guiding plate 208 can be attached to the conveyor belt assembly 108.

In an embodiment, the fixed guiding plate 206 can include one or more transition profiles 214 and the transition profile 214 is positioned in alignment with immediately adjacent conveyor belts. As shown in FIG. 2(*a*)-2(*d*), one transition profile 214 is wide enough to substantially cover the combined width of immediately adjacent conveyor belts 116. This allows, during operation, the transition profile 214 to act as a forced u-turn for the holders 112 on one conveyor belt 116 when moving onto the subsequent conveyor belt 116. Further, the opposite direction of motion of the subsequent conveyor belt 116 carries the holder 112 away from the transition profile and from the fixed guiding plate 206. Similarly, the detachable guiding plate 208 comprises one or more transition profiles 216 which perform the same function at the second end 212 as that performed by the transition profile 214 of the fixed guiding plate 206 at the first end 210 as explained above. As will be understood, the number of transition profiles 214 and 216 on the two guiding plates 206 and 208 can be determined based on the number of conveyor belts 116 in the conveyor belt assembly 108 and will be apparent to a person skilled in the art.

Further, in one example, to assist the turning motion of the holders 112 on the conveyor belts 112, the transition profiles 214 on the fixed guiding plate 206 and the transition profiles 216 on the detachable guiding plate 208 can be arcuately shaped. For instance, each transition profile 212 and 214 can be shaped as a substantially semi-circular arc with a diameter substantially equal to the combined width of the immediately adjacent conveyor belts 116 aligned to that transition profile 212, 214.

As explained previously, a processing unit of the computing device 102 can be operably coupled to the loading assembly 105 and the conveyor belt assembly 108 to control operations thereof. For example, among other things, the movements of the conveyor belts 116 or those of the actuator to move the slider 114 and/or the loading tray 106 can be performed by the processing unit. Further, the operations above which have been described as being performed by the computing device 102 can be understood as being performed by the processing unit thereof.

Further, the discharge region 118 adjacent to the last conveyor belt 116 in the conveyor belt assembly 108, which in the case of two-belt conveyor belt assembly 108 described above can be the second conveyor belt, can receive the holders 112. These holders 112 may be picked up from the discharge region 118 for further processing of the gemstone. In an example, the feeding assembly 100 of the present subject matter may be used for feeding gemstones with holders 112 to a gemstone planner machine. In another example, the feeding assembly 100 of the present subject matter may be used for feeding gemstones with holders 112 to a gemstone cutting machine. In yet another example, the feeding assembly 100 of the present subject matter may be used as gemstone feeding mechanism in an integrated gemstone processing machine.

Although implementations for gemstone feeding are described, it is to be understood that the present subject matter is not necessarily limited to the specific features of the systems or methods described herein. Rather, the specific features and methods are disclosed as implementations for gemstone feeding.

We claim:

1. A gemstone feeding machine comprising:
    a loading assembly comprising:
        a loading tray having a plurality of channels; and
        a slider,
        wherein the loading tray and the slider are adapted to exhibit relative motion with respect to each other; and
    a conveyor belt assembly positioned adjacent to the loading assembly, the conveyor belt assembly comprising:
        a plurality of conveyor belts positioned parallel to each other, the plurality of conveyor belts including at least a first conveyor belt to move in a first direction and at least a second conveyor belt to move in a second direction, wherein each of the at least first conveyor belt and the at least second conveyor belt is aligned with a channel from amongst the plurality of channels of the loading assembly;
        a fixed guiding plate positioned at a first end of the plurality of conveyor belts; and
        a detachable guiding plate positioned adjacent to the loading assembly at a second end of the plurality of conveyor belts.

2. The gemstone feeding machine as claimed in claim 1, wherein the fixed guiding plate comprises at least one transition profile, the at least one transition profile positioned in alignment with immediately adjacent conveyor belts.

3. The gemstone feeding machine as claimed in claim 2, wherein the at least one transition profile is arcuately shaped.

4. The gemstone feeding machine as claimed in claim 1, wherein the detachable guiding plate comprises at least one transition profile, the at least one transition profile positioned in alignment with immediately adjacent conveyor belts.

5. The gemstone feeding machine as claimed in claim 1, wherein the conveyor belt assembly further comprises a discharge region adjacent to the at least second conveyor belt.

6. The gemstone feeding machine as claimed in claim 1, wherein the loading assembly further comprises an actuator, the loading tray of the loading assembly being coupled to the actuator to move with respect to the slider as well as the conveyor belt assembly.

7. The gemstone feeding machine as claimed in claim 1, wherein the loading assembly further comprises an actuator, the slider of the loading assembly being coupled to the actuator to move with respect to the loading tray as well as the conveyor belt assembly.

8. The gemstone feeding machine as claimed in claim 1, further comprising a processing unit operably coupled to the loading assembly and the conveyor belt assembly to control operations thereof.

9. A gemstone feeding machine comprising:
- a conveyor belt assembly to feed holders carrying gemstones, the conveyor belt assembly comprising:
- a plurality of conveyor belts positioned parallel to each other forming a continuous path for feeding the holders, wherein the plurality of conveyor belts include a first set of conveyor belts to move in a first direction and a second set of conveyor belts to move in a second direction, the first set of conveyor belts are positioned alternately with respect to the second set of conveyor belts, wherein each conveyor belt in the first set is adjacent to a conveyor belt in the second set;
- a fixed guiding plate positioned at a first end of the plurality of conveyor belts; and
- a detachable guiding plate positioned adjacent to a loading assembly at a second end of the plurality of conveyor belts;
- wherein each of the fixed guiding plate and the detachable guiding plate comprises a plurality of transition profiles, each transition profile being positioned in alignment with immediately adjacent conveyor belts.

10. The gemstone feeding machine as claimed in claim 9, wherein each of the plurality of transition profiles is arcuately shaped.

11. The gemstone feeding machine as claimed in claim 10, wherein each of the plurality of transition profiles is shaped as a substantially semi-circular arc with a diameter substantially equal to a combined width of the immediately adjacent conveyor belts aligned thereto.

12. The gemstone feeding machine as claimed in claim 9, further comprising:
- the loading assembly positioned adjacent to the conveyor belt assembly, the loading assembly comprising:
- a loading tray having a plurality of channels; and
- a slider, wherein the loading tray and the slider are adapted to exhibit relative motion with respect to each other.

13. The gemstone feeding machine as claimed in claim 12, wherein the loading tray is coupled to an actuator to move with respect to the slider as well as the conveyor belt assembly.

14. The gemstone feeding machine as claimed in claim 12, wherein the slider is coupled to an actuator to move with respect to the loading tray as well as the conveyor belt assembly.

15. The gemstone feeding machine as claimed in claim 9, wherein the conveyor belt assembly further comprises a discharge region at an end of the continuous path.

16. The gemstone feeding machine as claimed in claim 9, further comprising a processing unit operably coupled to the loading assembly and the conveyor belt assembly to control operations thereof.

* * * * *